3,647,865
α-IMINO-2-TOLUIC ACIDS
Theodore S. Sulkowski, Narberth, and Albert A. Mascitti, Norristown, Pa., assignors to American Home Products Corporation, New York, N.Y.
No Drawing. Continuation-in-part of application Ser. No. 622,883, Mar. 14, 1967. This application Apr. 16, 1968, Ser. No. 721,591
Int. Cl. C07c 101/42
U.S. Cl. 260—518 R          7 Claims

ABSTRACT OF THE DISCLOSURE

This invention is concerned with toluic acids which are useful precursors in the preparation of 2-[amino-(lower)alkyl]phthalimidines which are utilized as intermediates in preparing 2-[amino(lower)alkyl]isoindolines which are pharmacologically efficacious as anti-depressants and anorexiants. This invention is also concerned with the process of preparing these toluic acid compounds.

---

This is a continuation-in-part application of U.S. patent application Ser. No. 622,883, filed on Mar. 14, 1967 by Theodore S. Sulkowski and Albert A. Mascitti entitled, "α-Imino-2-Toluic Acid" which is now abandoned.

This invention relates to new and novel toluic acids and to the process for their preparation. In particular, the α-imino-2-toluic acids of this invention are valuable intermediates in the synthesis of novel isoindolines which have pharmacological activity.

The new and novel compounds of this invention are represented by the following formula:

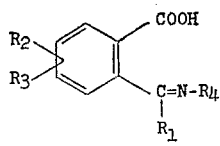

wherein $R_1$ is selected from the group consisting of lower alkyl, phenyl, phen(lower)alkyl, monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl; $R_2$ is selected from the group consisting of hydrogen, amino, lower alkylamino, halogen, lower alkyl and lower alkoxy; $R_3$ is hydrogen when $R_2$ and $R_3$ are dissimilar and when $R_2$ and $R_3$ are the same they are both selected from the group consisting of hydrogen, halogen, lower alkyl and lower alkoxy; and $R_4$ is amino(lower)alkyl. Typical examples thereof are: α-(2-aminoethylimino)-α-phenyl-2-toluic acid; and α-(2-aminoethylimino)-α(4-chlorophenyl)-2-toluic acid.

The new and novel compounds of the present invention may be prepared by the process of this invention which is illustrated by the following reaction scheme:

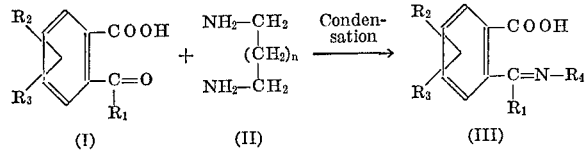

wherein $R_1$, $R_2$, $R_3$ and $R_4$ are defined as above and $n$ is an integer from 0 to 6. In practising the process outlined above, the compounds of this invention are prepared by heating approximately equimolar amounts of an appropriate 2-carbonyl benzoic acid (I) and a diamine (II), in a reaction-inert organic solvent, at about reflux temperatures, in an apparatus equipped with a water separator for a period of about one-half hour to about four hours.

When the reaction is completed, the precipitated product is removed by filtration and recrystallized from a suitable solvent e.g. aqueous-alkanol mixtures and dimethylformamide, to afford the desired α-imino-2-toluic acid (III).

By reaction-inert organic solvent, as employed above, is meant any solvent which will dissolve the reactants and cause precipitation of the resulting product (III). Many such solvents are known to those skilled in the art, examples thereof are: benzene, toluene, xylene, ethanol, chloroform, carbon tetrachloride and ether. The amount of solvent employed is not critical it being necessary to use only the amount needed to dissolve the reactants. Many of the reactants employed in the process of this invention are known compounds which are readily available from commercial sources while the remainder can easily be prepared in accord with standard procedures well known to those skilled in the art.

In accord with the present invention the α-imino-2-toluic acid compounds (III) herein described have been found to be valuable intermediates in the process for the synthesis of new and novel isoindolines which have pharmacological activity and are useful as anti-depressants and anorectics. The process in which the compounds of the present invention are utilized is disclosed and claimed in copending U.S. patent application, Ser. No. 622,917, filed on Mar. 14, 1967, entitled "Isoindoles, Insoindolines and Related Compounds" by Theodore S. Sulkowski.

The α-imino-2-toluic acids may be used to prepare 2-[amino(lower)alkyl]phthalimidines by reacting the α-imino-2-toluic acid with hydrogen at an initial pressure of about 45 p.s.i. in the presence of a palladium-charcoal catalyst in a suitable solvent e.g. acetic acid for a period of about 2 to about 24 hours. The resulting 2-[amino-(lower)alkyl]phthalimidine is separated by conventional procedures. The phthalimidine may be treated further with lithium aluminum hydride in anhydrous ether to yield the pharmacologically active isoindolines, which are useful as anorexiants at a dosage of 1.0–4.0 mg./kg. of body weight.

The following examples are given by way of illustration and are not to be construed as limitations of this invention, many variations of which are possible without departing from the scope and spirit thereof.

EXAMPLE I

A mixture of 2-benzoylbenzoic acid (11 g.), ethylenediamine (4 ml.) and 100 ml. of toluene are refluxed in a flask equipped with a water separator for one-half hour. Thereafter, the precipitated solid is separated by filtration and washed with ethanol. After recrystallization from aqueous-ethanol there is obtained α-[(2-aminoethyl)imino]-α-phenyl-2-toluic acid, M.P. 210° C. (dec.).

In a similar manner, reacting 2-(4-toluyl)benzoic acid with 1,3-propanediamine, there is obtained α-[(3-aminopropyl)imino]-α-(4-tolyl)-2-toluic acid.

EXAMPLE II

A mixture of 2-(4-chlorobenzoyl)benzoic acid (0.05 m.), ethylenediamine (0.05 m.) and 100 ml. of xylene are refluxed in a flask equipped with a water separator for an hour. Thereafter, the precipitated solid is separated by filtration and washed with ethanol. After recrystallization from aqueous-ethanol, there is obtained α-[(2-aminoethyl)imino]-α-(4-chlorophenyl)-2-toluic acid, M.P. 228–230° C. (dec.).

Analysis.—Calc'd for $C_{16}H_{15}N_2O_2Cl$ (percent): C, 63.47; H, 4.99; N, 9.26; Cl, 11.71. Found (percent): C, 63.40; H, 4.76; N, 9.21; Cl, 11.6.

In a similar manner, reacting 2-(4-bromobenzoyl)benzoic acid with 1,4-diaminobutane affords α-[(4-aminobutyl)imino]-α-(4-bromophenyl)-2-toluic acid.

EXAMPLE III

The procedure of Examples I and II is repeated to react an appropriate 2-carbonyl benzoic acid with a diamine to produce the hereinafter listed α-imino-2-toluic acids:

α-[(2-aminoethyl)imino]-4-bromo-α-(4-tolyl-2-toluic acid;
α-[(2-aminoethyl)imino]-4,5-dibromo-α-phenyl-2-toluic acid;
α-[(3-aminopropyl)imino]-α-(3,4-dichlorophenyl)-2-toluic acid;
α-[(2-aminoethyl)imino]-α-(5,6,7,8-tetrahydro-2-naphthyl)-2-toluic acid;
α-[(2-aminoethyl)imino]-α-(4-trifluoromethylphenyl)-2-toluic acid;
α-[(5-aminopentyl)imino]-α-pyridyl-2-toluic acid;
α-[(2-aminoethyl)imino]-α-thienyl-2-toluic acid;
α-[(2-aminoethyl)imino]-α-ethyl-2-toluic acid;
α-[(3-aminopropyl)imino]-α-methyl-2-toluic acid; and
α-[(2-aminoethyl)imino]-α-butyl-2-toluic acid.

EXAMPLE IV

A mixture of 2-benzoyl-5-chlorobenzoic acid (0.025 m.), ethylenediamine (0.025 m.) and 50 ml. of ether are refluxed in a flask equipped with a water separator for one hour. Thereafter, the precipitated solid is separated by filtration and washed with methanol. After recrystallization from aqueous methanol, there is obtained α-[(2-aminoethyl)imino]-5-chloro-α-phenyl-2-toluic acid.

In a similar manner, α-[(3-aminopropyl)imino]-α-(4-flurophenyl)-2-toluic acid and α-[(2-aminoethyl)imino]-α-(2,4-dimethoxyphenyl)-2-toluic acid are prepared.

EXAMPLE V

When the procedure of the aforementioned examples is employed, reacting the hereinafter listed 2-carbonyl benzoic acids and diamines, the following products are obtained:

| Starting materials | Products |
| --- | --- |
| 2-benzoyl-4-ethylbenzoic acid and ethylenediamine. | α-[(2-aminoethyl)imino]-4-ethyl-α-phenyl-2-toluic acid. |
| 2-benzoyl-5-ethylaminobenzoic acid and butane-1,4-diamine. | α-[(4-aminobutyl)imino]-5-ethylamino-α-phenyl-2-toluic acid. |
| 2-benzoyl-4,5-dimethoxybenzoic acid and propylenediamine. | α-[(3-aminoisopropyl)imino]-4,5-dimethoxy-α-phenyl-2-toluic acid. |
| 2-(2-furoyl)benzoic acid and ethylenediamine. | α-[(2-aminoethyl)imino]-α-(2-furyl)-2-toluic acid. |

EXAMPLE VI

A mixture of 2-(4-chlorobenzoyl)benzoic acid (0.05 m.), 1,4-diaminobutane (0.05 m.) and 100 ml. of toluene are refluxed in a flask equipped with a water separator for one hour. Thereafter, the precipitated solid is separated by filtration and washed with ethanol. After recrystallization from aqueous-ethanol, there is obtained α-[(4-aminobutyl)imino] - α - (4-chlorophenyl)-2-toluic acid, M.P. 262° C.

Analysis.—Calc'd for $C_{18}H_{19}N_2O_2Cl$ (percent): C, 65.35; H, 5.79; N, 8.47; Cl, 10.73. Found (percent): C, 65.37; H, 5.99; N, 8.39; Cl, 10.4.

In a similar manner, the following compounds are prepared:

α-[(4-aminobutyl)imino]-α-(3,4-dimethylphenyl)-2-toluic acid;
α-[(2-aminoethyl)imino]-4,5-dimethyl-α-phenyl-2-toluic acid;
α-[(5-aminopentyl)imino]-5-ethoxy-α-phenyl-2-toluic acid;
α-[(2-aminoethyl)imino]-α-(4-ethoxyphenyl)-2-toluic acid;
α-[(2-aminoethyl)imino]-α-(4,5-dibromophenyl)-2-toluic acid; and
4-amino-α-[(2-aminoethyl)imino]-α-phenyl-2-toluic acid.

EXAMPLE VII

A mixture of 2-(3,5-diethylbenzoyl)benzoic acid (0.10 m.), ethylene diamine (0.10 m.) and 200 ml. of carbon tetrahydrochloride are refluxed in a flask equipped with a water separator for one-half hour. Thereafter, the precipitated solid is separated by filtration and washed with propanol. After recrystallization from aqueous propanol, there is obtained α-[(2-aminoethyl)imino]-α-(3,5-diethylphenyl)-2-toluic acid.

Similarly, α-[(2-aminoethyl)imino] - α - (3,5-diethoxyphenyl)-2-toluic acid; α-[(3-aminopropyl)imino]-4,5-diethyl-α-phenyl-2-toluic acid and α-[(4-aminobutyl)imino]-4,5-diethoxy-α-phenyl-2-toluic acid are produced.

EXAMPLE VIII

A mixture of 2-(4-chlorobenzoyl)benzoic acid (0.15 m.), 1,6-diaminohexane (0.15 m.) and 150 ml. of toluene are refluxed in a flask equipped with a water separator for two hours. Thereafter, the precipitated solid is separated by filtration and washed with ethanol. After recrystallization from aqueous-ethanol, there is obtained α-[(6-aminohexyl)imino]-α-(4-chlorophenyl) - 2 - toluic acid, M.P. 225° C. (dec.).

In a similar manner, α-[(4-aminobutyl)imino]-α-benzyl-2-toluic acid and α-[(2-aminoethyl)imino]-α-phenethyl-2-toluic acid are synthesized.

What is claimed is:
1. A compound selected from the group consisting of those having the formula:

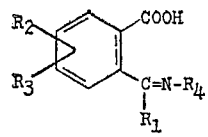

wherein $R_1$ is selected from the group consisting of lower alkyl, phenyl, phen(lower)alkyl, chlorophenyl, bromophenyl, fluorophenyl, dichlorophenyl, dibromophenyl, mono(lower)alkylphenyl, di(lower)alkylphenyl, trifluoromethylphenyl, mono(lower)alkoxyphenyl [thienyl, pyridyl, furyl] and tetrahydro-2-naphthyl; $R_2$ is selected from the group consisting of hydrogen, amino, lower alkylamino, chloro, bromo, lower alkyl, and lower alkoxy; $R_3$ is hydrogen when $R_2$ and $R_3$ are dissimilar and when $R_2$ and $R_3$ are the same they are both selected from the group consisting of hydrogen, bromo, lower alkyl and lower alkoxy; and $R_4$ is amino(lower)alkyl.

2. A compound as described in claim 1 which is: α-[(2-aminoethyl)imino]-α-phenyl-2-toluic acid.

3. A compound as described in claim 1 which is: α-[(2-aminoethyl)imino]-α-(4 - chlorophenyl) - 2 - toluic acid.

4. A compound as described in claim 1 which is: α-[(4-aminobutyl)imino]-α-(4-chlorophenyl) - 2 - toluic acid.

5. A compound as described in claim 1 which is: α-[(6 - aminohexyl)imino]-α-(4 - chlorophenyl)-2-toluic acid.

6. A compound as described in claim 1 which is: α - [(2-aminoethyl)imino]-4-bromo-α-(4-tolyl)-2-toluic acid.

7. A compound as described in claim 1 which is: α-[(2-aminoethyl)imino]-α-(3,5 - diethylphenyl)-2-toluic acid.

References Cited

Fieser, F. L. et al., Organic Chemistry (1956), published by Reinhold Corp. of New York, page 211 relied on.

LORRAINE A. WEINBERGER, Primary Examiner

L. A. THAXTON, Assistant Examiner

U.S. Cl. X.R.

260—295 D, 332.2 A, 347.3, 518 A, 519, 999